US008589742B2

(12) United States Patent
Palem et al.

(10) Patent No.: US 8,589,742 B2
(45) Date of Patent: Nov. 19, 2013

(54) COMPUTING DEVICE USING INEXACT COMPUTING ARCHITECTURE PROCESSOR

(75) Inventors: Krishna V. Palem, Houston, TX (US); Lakshmi Narasimhan Chakrapani, Houston, TX (US); Avinash Lingamneni, Houston, TX (US)

(73) Assignee: William Marsh Rice University, Houston, TX (US)

( * ) Notice: Subject to any disclaimer, the term of this patent is extended or adjusted under 35 U.S.C. 154(b) by 258 days.

(21) Appl. No.: 13/254,029

(22) PCT Filed: Mar. 9, 2010

(86) PCT No.: PCT/US2010/026686
§ 371 (c)(1),
(2), (4) Date: Aug. 31, 2011

(87) PCT Pub. No.: WO2010/104871
PCT Pub. Date: Sep. 16, 2010

(65) Prior Publication Data
US 2011/0321067 A1     Dec. 29, 2011

Related U.S. Application Data

(60) Provisional application No. 61/158,663, filed on Mar. 9, 2009.

(51) Int. Cl.
*G06F 11/00*     (2006.01)
(52) U.S. Cl.
USPC .................................................. 714/47.1
(58) Field of Classification Search
USPC ................................................... 714/100
See application file for complete search history.

(56) References Cited

U.S. PATENT DOCUMENTS

| 7,287,185 | B2 * | 10/2007 | Safford et al. | 714/11 |
| 2002/0133751 | A1 * | 9/2002 | Nair et al. | 714/38 |
| 2006/0156157 | A1 * | 7/2006 | Haselden et al. | 714/746 |
| 2007/0168762 | A1 * | 7/2007 | Bartley et al. | 714/52 |
| 2011/0231709 | A1 * | 9/2011 | Bellocchio et al. | 714/38.1 |
| 2012/0210164 | A1 * | 8/2012 | Gara et al. | 714/10 |
| 2012/0293624 | A1 * | 11/2012 | Chen et al. | 348/46 |
| 2013/0024740 | A1 * | 1/2013 | Xia et al. | 714/746 |

OTHER PUBLICATIONS

International Search Report from PCT/US2010/026686 dated Aug. 2, 2010 (2 pages).
Written Opinion from PCT/US2010/026686 dated Aug. 2, 2010 (8 pages).
Akgul, Bilge E.S. et al.; Probabilistic CMOS Technology: A Survey and Future Directions; Center for Research on Embedded Sstems and Technology, School of Electrical and Computer Engineering, Georgia Institute of Technology, Atlanta, Georgia; 2006 IFIP International Conference; IEEE; Oct. 1, 2006 (6 pages).
Chakrapani, Lakshmi N. et al.; "Probabilistic System-on-a-Chip Architectures"; Georgia Institute of Technology; ACM Transactions on Design Automation of Electronic Systems ACM USA; vol. 12, No. 3; Aug. 2007; XP007914088 (24 pages).

\* cited by examiner

*Primary Examiner* — Bryce Bonzo
(74) *Attorney, Agent, or Firm* — Osha Liang LLP (57) ABSTRACT

In general, in one aspect, the invention relates to a computer readable medium including software instructions which, when executed by a processor, perform a method, the method including receiving a first method call from an application, wherein the first method call is associated with a first application component; obtaining a first application component error tolerance (ACET) value associated with the first method call; determining, using the first ACET value and a first inexact amount value (IAV) of a first inexact computing architecture (ICA) processor, that the first ICA processor is available to execute the first method call; and processing the first method call using the first ICA processor.

15 Claims, 9 Drawing Sheets

COMPUTING DEVICE USING INEXACT COMPUTING ARCHITECTURE PROCESSOR

CROSS-REFERENCE TO RELATED APPLICATIONS

The present application claims priority to PCT Application No. PCT/2010026686 filed on Mar. 9, 2010, which is hereby incorporated by reference. PCT Application No. PCT/2010026686 claims priority to U.S. Provisional Application No. 61/158,663 filed on Mar. 9, 2009, which is hereby incorporated herein by reference.

BACKGROUND

A modern computer system may be divided roughly into three conceptual elements: the hardware, the operating system, and the application programs. The hardware, e.g., the processor, the memory, the persistent storage devices, and the input/output devices, provides the basic computing resources. The application programs, such as compilers, database systems, software, and business programs, define the ways in which these resources are used to solve the computing problems of the users. The users may include people, machines, and other computers that use the application programs, which in turn employ the hardware to solve numerous types of problems.

An operating system ("OS") is a program that acts as an intermediary between a user of a computer system and the computer hardware. The purpose of an operating system is to provide an environment in which a user can execute application programs in a convenient and efficient manner. A computer system has many resources (hardware and software) that may be required to solve a problem, e.g., central processing unit ("CPU") time, memory space, file storage space, input/output ("I/O") devices, etc. The operating system acts as a manager of these resources and allocates them to specific programs and users as necessary. Because there may be many, possibly conflicting, requests for resources, the operating system must decide which requests are allocated resources to operate the computer system efficiently and fairly.

The fundamental goal of a computer system is to execute user programs and make solving user problems easier. Toward this goal, computer hardware is constructed. Because bare hardware alone is not particularly easy to use, application programs are developed. These various programs require certain common operations, such as those controlling the I/O operations. The common functions of controlling and allocating resources are then brought together into one piece of software: the operating system.

In order to conserve energy, some computer systems incorporate power control mechanisms. For example, Energy Star ("E*") power requirements require system power consumption to be lowered to 15% of the normal operating power consumption level when the system is idle. In order to conserve power, the operating system turns off (or lowers the operating frequencies of) inactive devices, such as hard disks and monitors (Energy Star® is a registered trademark of the U.S. Government).

SUMMARY

In general, in one aspect, the invention relates to a computer readable medium including software instructions which, when executed by a processor, perform a method, the method including receiving a first method call from an application, wherein the first method call is associated with a first application component; obtaining a first application component error tolerance (ACET) value associated with the first method call; determining, using the first ACET value and a first inexact amount value (IAV) of a first inexact computing architecture (ICA) processor, that the first ICA processor is available to execute the first method call; and processing the first method call using the first ICA processor.

In general, in one aspect, the invention relates to a display including a touchscreen; a conventional processor; an inexact computing architecture (ICA) processor associated with a first inexact amount value (IAV); an application component error tolerance (ACET) data structure including a ACET associated with an application component; a persistent storage including software instructions which, when executed by the conventional processor, perform a method, the method including: receiving a method call from an application, wherein the method call is associated with the application component; obtaining the ACET value from the ACET data structure; determining, using the ACET value and the IAV, that the ICA processor is available to execute the method call; selecting the ICA processor to execute the method call using a processor distribution policy (PDP), wherein the PDP specifies minimal power utilization as a selection criterion; and processing the method call using the ICA processor.

In general, in one aspect, the invention relates to a display including a touchscreen; a conventional processor; an inexact computing architecture (ICA) processor associated with a first inexact amount value (IAV); an application component error tolerance (ACET) data structure including a ACET associated with an application component; a persistent storage including software instructions which, when executed by the conventional processor, perform a method, the method including: receiving a method call from an application, wherein the method call is associated with the application component; obtaining the ACET value from the ACET data structure; determining, using the ACET value and the IAV, that the ICA processor is available to execute the method call; selecting the ICA processor to execute the method call using a processor distribution policy (PDP), wherein the PDP specifies minimal power utilization as a selection criterion; and processing the method call using the ICA processor.

In general, in one aspect, the invention relates to a computing device, including: an application-specific conventional processor configured to perform a first operation of an application to generate a first result; an application-specific inexact computing architecture (ICA) processor to perform a second operation of the application to generate a second result; and a display configured to display at least one selected from a group consisting of the first result and the second result.

DETAILED DESCRIPTION

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a computing device. Specifically, embodiments of the invention relate to a computing device, which uses inexact computer architecture (ICA) processors. Further, embodiments of the invention relate to computing devices that use both conventional and ICA processors.

Figure 1:
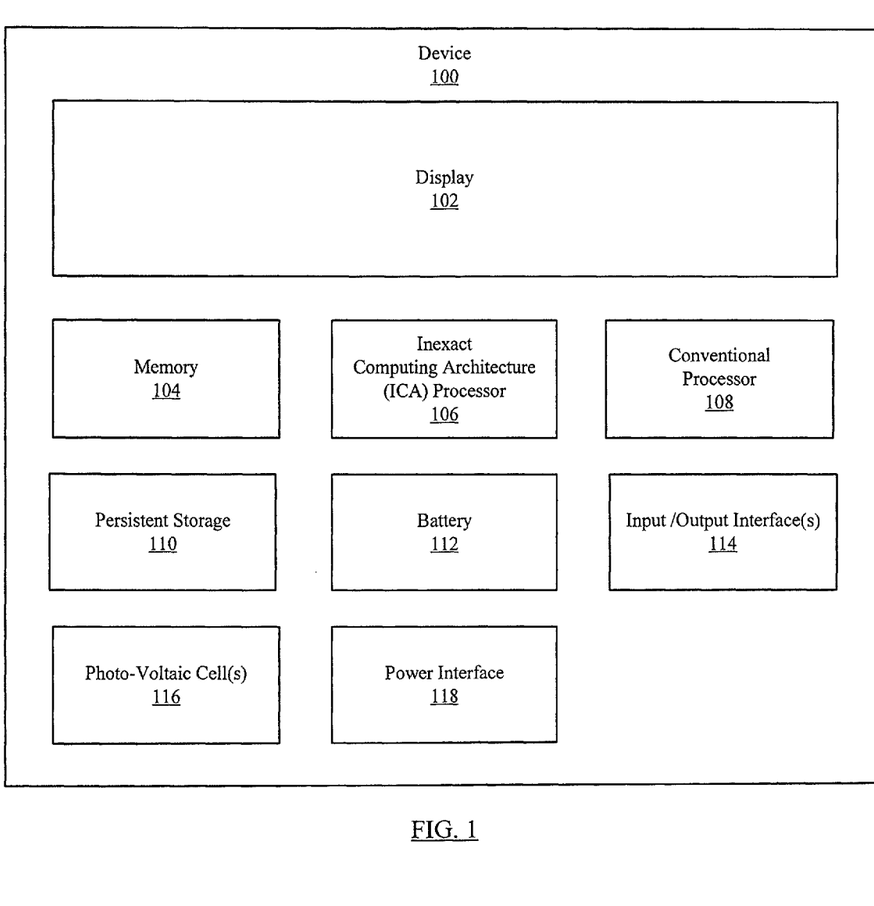
FIG. 1 shows a computing device in accordance with one or more embodiments of the invention.

FIG. 1 shows a computing device in accordance with one embodiment of the invention. As shown in FIG. 1, the device (100) that includes a display (102), memory (104), an ICA processor (106), a conventional processor (108), persistent storage (110), a battery (112), an input interface (114), a photo-voltaic cell (116), a power interface (118), and an output interface (120). Each of these elements is described below.

In one embodiment of the invention, the display (102) is configured to present textual and/or graphical information to a user of the device (100). The display (102) may be embodied as a Liquid Crystal Display (LCD) screen, a plasma screen, or any other physical mechanism for presenting textual and/or graphical information to a user of the device (100). In one embodiment of the invention, the display (102) may be further configured to receive input from a user. For example, the display may be a touchscreen implemented: (i) as a resistive touchscreen, (ii) using surface acoustic wave (SAW) technology, (iii) as a capacitive touchscreen; (iv) using projected capacitance, (v) using a strain gauge configuration, (vi) using optical imaging; (vii) using dispersive signal technology, (viii) using acoustic pulse recognition, (ix) using coded LCD technology, or (x) any other technology suitable for recognizing touch input from a user (or from a physical object controlled by a user—such a stylus or a light pen). In one embodiment of the invention, the display may be integrated into the device (100) or may be external to the device (100) (e.g., a display wired or wirelessly connected to the device).

In one embodiment of the invention, the device (100) may include one or more ICA processors (106) and one or more conventional processors (108). The ICA processors and the conventional processors may be implemented using any type of processor architecture, e.g., complex instruction set computer (CISC) architecture, reduced instruction set computer (RISC) architecture, a limited application-specific programmable processor, an application-specific non-programmable processor, etc. In one embodiment of the invention, the ICA processor may be constructed as a deterministic processor in which the same (erroneous or inexact) output is obtained for a given input irrespective of the number of times the input is repeated. In one embodiment of the invention, the ICA processor may be constructed as a probabilistic processor in which different (erroneous or inexact) output is obtained for a given input each time the input is repeated. The ICA processor can be realized using one of these two ways.

In one embodiment of the invention, the ICA processor (106) is a processor with a specified inexact amount value (IAV). In one embodiment of the invention, an IAV corresponds to (i) the rate at which the result of an operation performed on the ICA processor will be inexact (i.e., the error rate) or (ii) the magnitude of error in the result of an operation performed on the ICA processor (i.e., the error magnitude).

In one embodiment of the invention, the error rate may be measured as the number of erroneous or inexact outputs produced for a given number of inputs. In one embodiment of the invention, the error rate is expressed as a number between 0 and 1. In one embodiment of the invention, the error rate is expressed as a percentage.

In one embodiment of the invention, the error magnitude measures the difference between the output received (i.e., the calculated result) and the expected output (i.e., the correct result). In one embodiment of the invention, the error magnitude in a result is mathematically defined as follows:

$$\text{Magnitude of Error} = |\text{Calculated Result} - \text{Correct Result}|.$$

In one embodiment of the invention, the error magnitude may be calculated as a ratio or percentage of the output received (i.e., the calculated result) to the expected output (i.e., the correct result). In one embodiment of the invention, the error magnitude in a result is mathematically defined as follows:

$$\{(|\text{Calculated Result} - \text{Correct Result}|)/\text{Correct Result}\} * 100.$$

In one embodiment of the invention, the magnitude of error in a result of a given operation with given inputs is always the same (i.e., error magnitude is deterministic).

In one embodiment of the invention, the IAV for a given ICA processor may be the same for the result of all operations performed by the ICA processor. In one embodiment of the invention, the IAV may be a series of values. For example, in one embodiment of the invention, each IAV of a series of IAVs may correspond to a single operation, a group of operations, a set of inputs, a group of input sets, or a combination of operation(s) and input(s), such that for a given operation with particular inputs the IAV is always the same.

In one embodiment of the invention, ICA processors (106) have IAVs of greater than zero. One embodiment of an ICA processor is described in U.S. Pat. No. 7,290,154, which is incorporated by reference in its entirety. Another embodiment of an ICA processor is described in U.S. patent application Ser. No. 12/527,211, which is incorporated by reference in its entirety. In one embodiment of the invention, the conventional processor (108) corresponds to any processor that has an IAV value tending to zero. Those skilled in the art will appreciate that even though conventional processors are designed to have IAVs equal to zero (i.e., no error), due to the laws of physics, the true IAV will not be zero but will almost be zero.

In one embodiment of the invention, the memory (104) corresponds to any volatile storage, such as Random Access Memory (RAM). In one embodiment of the invention, the persistent storage (110) corresponds to any persistent storage medium, including but not limited to, magnetic media (e.g., magnetic hard disk, tape drive), solid state media (e.g., NAND Flash, NOR Flash, etc.), optical media (e.g., optical drives), any other suitable tangible persistent storage media, or any combination thereof.

In one embodiment of the invention, the battery (112) corresponds to any power source capable of holding a charge and providing a direct current (DC) to the device (100) (or components executing thereon).

In one embodiment of the invention, the input/output interfaces (I/O interfaces) (114) correspond to any wired or wireless interface used to receive input and/or send output. Examples of I/O interfaces include, but are not limited to, a keyboard, a mouse, a Universal Serial Bus (USB) port(s), a network interface, a Bluetooth Interface (Bluetooth® is a registered trademark of the Bluetooth SIG), a wireless network interface, etc.

In one embodiment of the invention, the photo-voltaic cell(s) corresponds to any mechanism capable of converting light (such as, but not limited to, UV light) into current, such that it may charge the battery (112) and/or power the device (100).

In one embodiment of the invention, the power interface (118) corresponds to any interface configured to provide direct current (DC) to the device (100). In an alternative embodiment, the power interface (118) may be configured to accept alternating current (AC) and covert the AC into DC, for use by the device (100) (or component therein).

Those skilled in the art will appreciate that the device (100) shown in FIG. 1 is exemplary and not intended to limit the scope of the invention.

Figure 2:
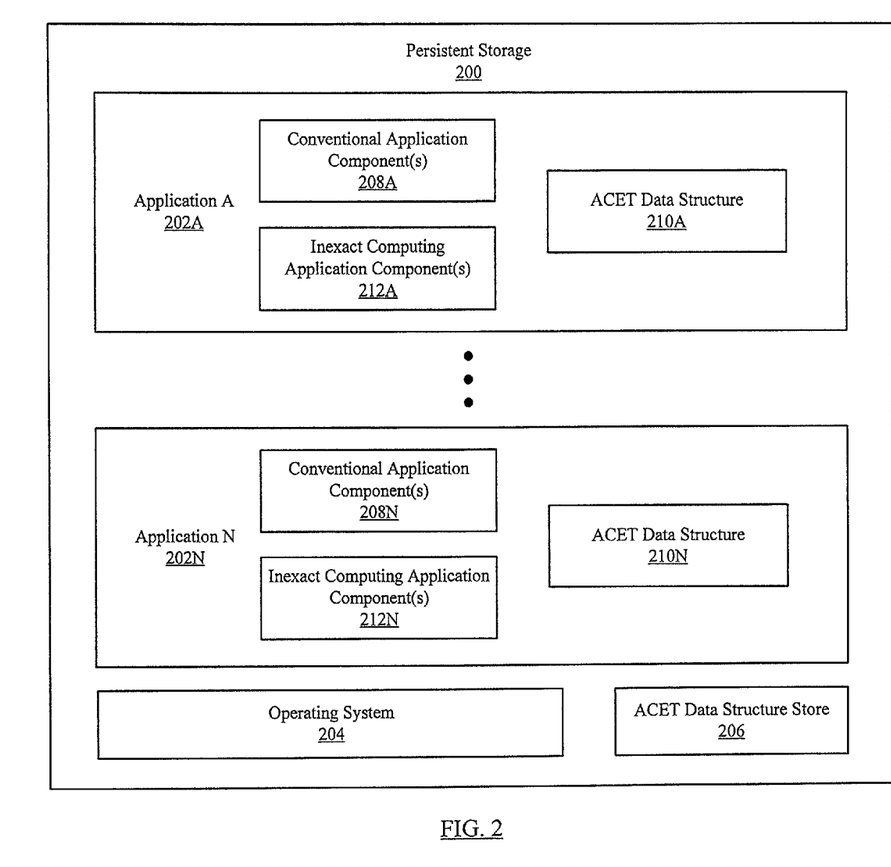
FIG. 2 shows persistent storage in accordance with one or more embodiments of the invention.

FIG. 2 shows persistent storage in accordance with one embodiment of the invention. As shown in FIG. 2, the persistent storage (200) includes one or more applications (application A (202A), application N (202N)), an operating system (OS) (204), and an application component error tolerance (ACET) data structure store (206).

Further, as shown in FIG. 2, each application (application A (202A), application N (202N)) includes one or more conventional application components (208A, 208N), zero or more inexact computing architecture (ICA) application components (212A, 212N), and, optionally, an ACET data structure (210A, 210N). Each of these components is described below.

In one embodiment of the invention, the OS (204) is a program that acts as an intermediary between applications and the underlying hardware in the device (100). Examples of operating systems include, but are not limited to, Solaris (Solaris™ is a trademark of Sun Microsystems, Inc.), Windows (Windows® is a registered trademark of Microsoft Corporation), Linux (Linux® is the registered trademark of Linus Torvals), Symbian (Symbian™ is a trademark of the Symbian Foundation), and Android (Android™ is a trademark of Google Inc.). Additional functionality of the OS is described below in the FIGS. 4-5.

In one embodiment of the invention, each application includes a number of components, where each component includes one or more methods. Further, one or more of the methods specifies an operation to perform on data associated with the application. For example, the method call may be to generate a graphical output on the display in response to an input received from a user. In such cases, the method takes the input as a parameter, performs the necessary operations to generate a response, and then performs additional operations to generate the corresponding graphical output for the display.

In one embodiment of the invention, each application component may be designated as a conventional application component (208A, 208N) or an ICA application component (212A, 212N). Application components that are designated as conventional application components only include methods from which result error is not tolerated. Said another way, the application in which the conventional application component is located, requires methods for the designated application components to always return error free results (within the practical limitations described above with respect to IAVs of zero). In contrast, application components that are designated as ICA application components only include methods from which result error is tolerated. Said another way, the application in which the ICA application component is located, tolerates methods for the designated application components to return results that may include error.

In one embodiment of the invention, a result is deemed to have no result error if the result of executing the method on a given set of inputs returns the expected result. Similarly, a result is deemed to have result error if the result of executing the method on a given set of inputs does not return the expected result. For example, consider a scenario in which the method performs a summation of the inputs, and integer values 4 and 5 are provided as inputs. In the no result error case, the answer is 9 and the in the result error case the answer may be a value other than 9. Further, the result error that a given ICA application component tolerates may be defined with respect to (i) an error rate and/or (ii) a magnitude of error in the result.

Returning to the discussion of conventional application components and ICA application components, the conventional application components tolerate no result error (or almost no error), while the ICA application components tolerate result error. Further, the amount of error tolerated may vary between ICA application components in a given application. In one embodiment of the invention, the amount of error a given ICA application component tolerates is quantified by an ACET value associated with the ICA application component. The ACET value quantifies the maximum amount of error the ICA application component tolerates as (i) an error rate and/or (ii) a magnitude of error in the result.

The ACET value for ICA application components may vary based on the methods in the ICA application component and the importance of methods (or more specifically the results of performing the methods) in relation to the application as a whole. For example, the ACET value for an ICA application component including methods to generate audio output within an application where audio clarity is not a primary concern (e.g., audio of a lecture, internet telephony, etc.) may be relatively high (i.e., the resulting audio is still comprehensible despite a high percentage of errors). In contrast, an ICA application component intended to interpret user input (e.g., recognize a keystroke made by the user) may have a relatively low ACET value (e.g., only a few errors are tolerated in order maintain a minimum level of device usability). Finally, an application component intended for use in file decryption may have an ACET value of zero (i.e., any miscalculation would result in an unusable result).

In one embodiment of the invention, the ACET value for an ICA application component may be the same each time the ICA application component is called. Such ACET value are referred to as static ACET values. In one embodiment of the invention, the ACET value for an ICA application component may be context dependent. For example, the ACET value of the ICA application component may depend upon a device state and/or variable set by the user (e.g., a user setting which sets a minimal level of acceptable audio quality). Such ACET values are referred to as dynamic or state-dependent ACET values. In another example, the ACET value for a given ICA application component may increase as the amount of available battery power decreases in order to allow the device to execute for a longer period of time prior to recharging.

In one embodiment of the invention, the designation of application components as conventional application components and/or ICA application components may be performed by the application developers, the user of the device, by a third-party, or by a combination thereof. In one embodiment of the invention, any application components not designated as an ICA application components are designated, by default, as a conventional application component.

In one embodiment of the invention, the ACET value for each ICA application component may be set by the application developers, the user of the device, by a third-party, or by a combination thereof. In one embodiment of the invention, any ICA application components for which an ACET value is not specified are treated as conventional application components (i.e., application components with an ACET value of zero).

Figure 3:
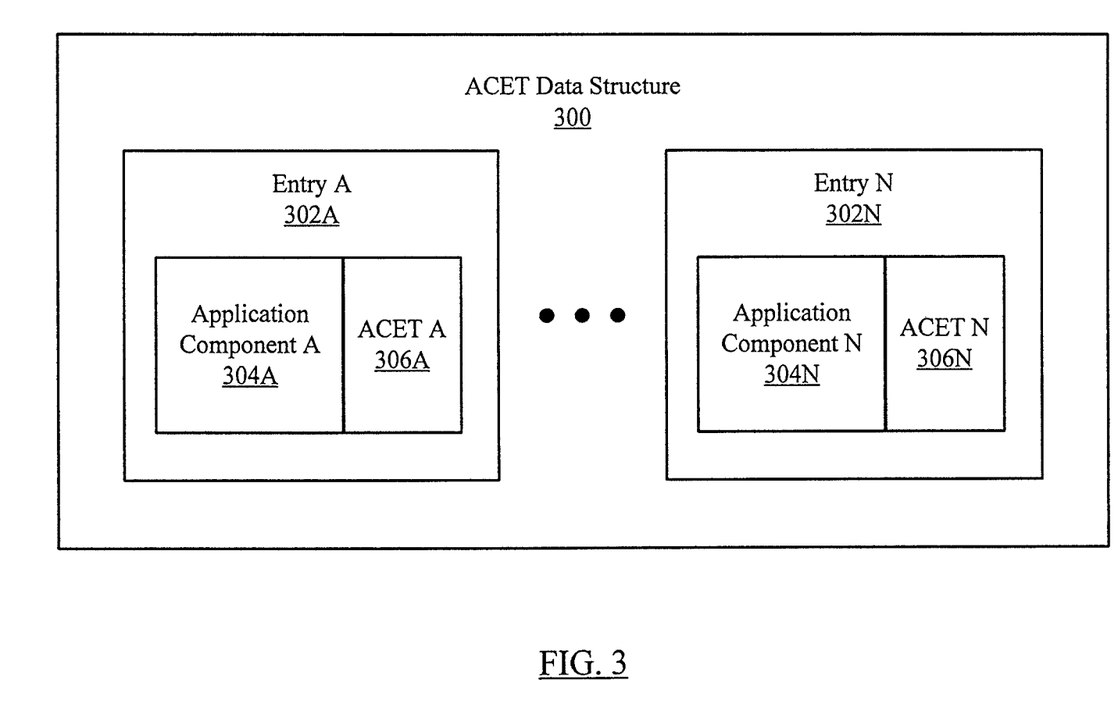
FIG. 3 shows an application component error tolerance (ACET) data structure in accordance with one embodiment of the invention.

In one embodiment of the invention, the designation of an application component as a conventional application component or an ICA application component, as well as the ACET value for the ICA application components, may be stored in an ACET data structure (210A, 210N). One embodiment of the ACET data structure is shown in FIG. 3 and described below. As shown in FIG. 2, the ACET data structure stored the aforementioned information on a per-application basis. However, as an alternative or in addition to the per-application ACET data structures, the device (100) may also maintain an ACET data structure store (206), which includes the designation of an application component as a conventional application component or a ICA application component, as well as the ACET value for the ICA application components for multiple applications on the device (100).

In one embodiment of the invention, the device (100) may include: (i) only per-application ACET data structures, (ii) only the ACET data structure store, or (iii) a combination of (i) and (ii).

FIG. 3 shows an ACET data structure in accordance with one embodiment of the invention. As depicted in FIG. 3, the ACET Data Structure (300) includes one or more entries (Entry A (302A), Entry N (302N)). In one embodiment of the invention, each entry (Entry A (302A), Entry N (302N)) includes an application component (Application Component A (304A), Application Component N (304N)) and an ACET value (ACET A (306A), ACET N (306N)) associated with that application component. In one embodiment of the invention, the ACET data structure (300) may only include application components designated as ICA application components. In such cases, all other application components are designated, by default, as conventional application components. Further, in one embodiment of the invention, the ACET Data Structure Store (206) may be implemented using a data structure similar to the one shown in FIG. 3, with additional information to indicate to which application each application component belongs.

Figure 4:
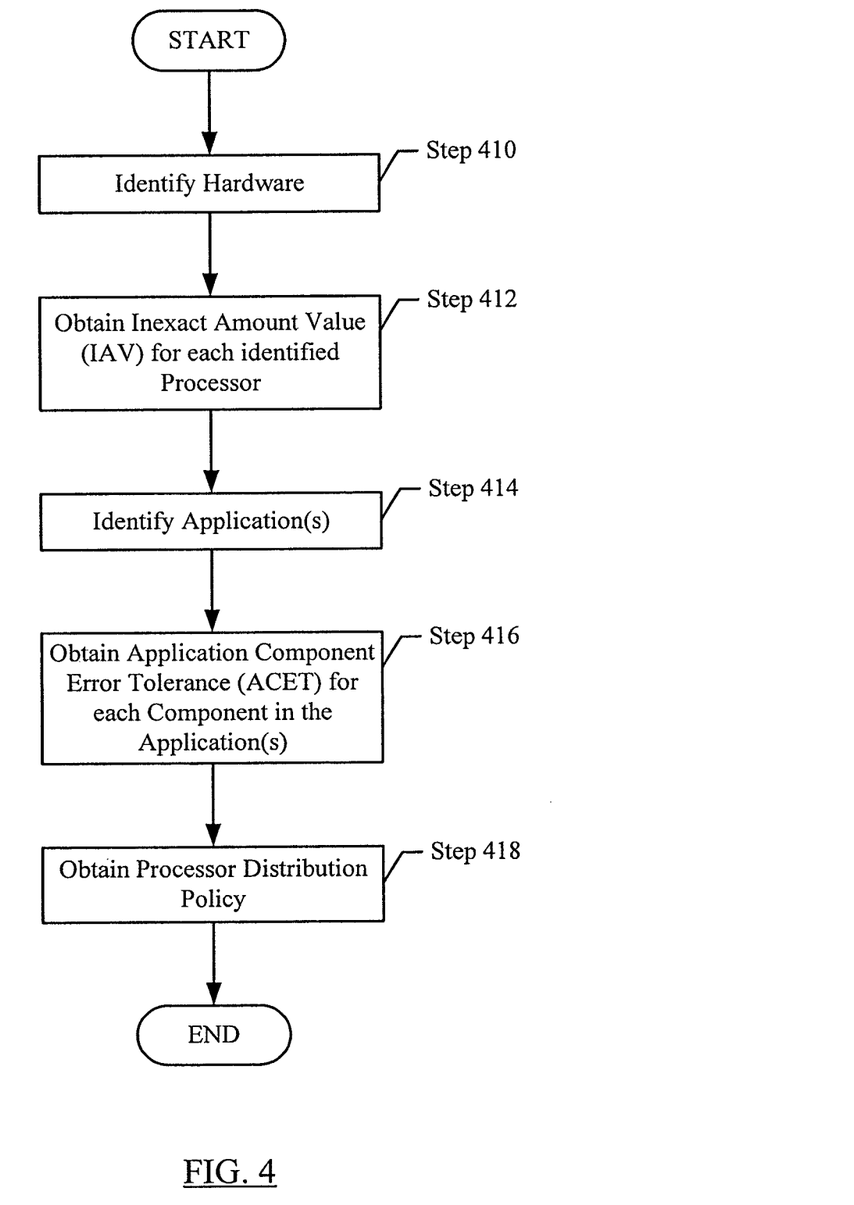
FIGS. 4-5 show flowcharts in accordance with one or more embodiments of the invention.

FIG. 4 shows a flow chart for in accordance with one or more embodiments of the invention. In one or more embodiments of the invention, one or more of the steps shown in FIG. 4 may be omitted, repeated, performed in parallel, and/or performed in a different order than that shown in FIG. 4. Accordingly, the specific arrangement of steps shown in FIG. 4 should not be construed as limiting the scope of the invention.

In Step 410, the OS identifies the hardware on the device. In Step 412, the OS obtains the inexact amount value (IAV) for each identified processor. In Step 414, the OS identifies the applications in the persistent storage of the device.

In Step 416, the OS obtains the ACET value for each application component of the identified applications. In one embodiment of the invention, the obtaining the ACET value for each application component includes (i) identifying the designation of each application component in the applications identified in Step 414 and (ii) obtaining the ACET value for each application component designated as an ICA application component. In one embodiment of the invention, the aforementioned information (or a least a portion thereof) may be obtained during execution of the application instead of in Step 416.

In Step 418, the OS optionally obtains a processor distribution policy (PDP). In one embodiment of the invention, the PDP defines how the operating system selects a given ICA processor from a number of available ICA processors on the device. In one embodiment of the invention, the OS may include default PDPs and/or PDPs may be obtained from the user, a third-party, or any combination thereof. Further, the PDPs may be obtained at anytime during the lifecycle of the device.

The following are non-limiting examples of PDPs:

Example Policy 1—The ICA processor with the highest IAV is selected to process the method call. The policy may be used when minimal power utilization is desired.

Example Policy 2—The ICA processor with the lowest IAV is selected to process the method call. The policy may be used when maximum result accuracy (with respect to using other ICA processors) is desired.

Example Policy 3—The ICA processor with the highest IAV and the lowest current utilization relative to the other available ICA processors is selected to process the method call. The policy may be used when minimal power utilization is desired while maintaining application performance.

Example Policy 4—The ICA processor with the lowest IAV and the lowest current utilization relative to the other available ICA processors is selected to process the method call. The policy may be used when maximum result accuracy (with respect to using other ICA processors) is desired while maintaining application performance.

Example Policy 5—The conventional processor is selected to process the method. This policy may be used when accuracy is required and power utilization is not an issue (e.g., when the device is plugged in to an AC or DC power source).

In one embodiment of the invention, the current utilization of a processor may be quantified as the ratio of the proportion of time the processor is active to the proportion of time the processor is inactive (i.e., idle).

Figure 5:
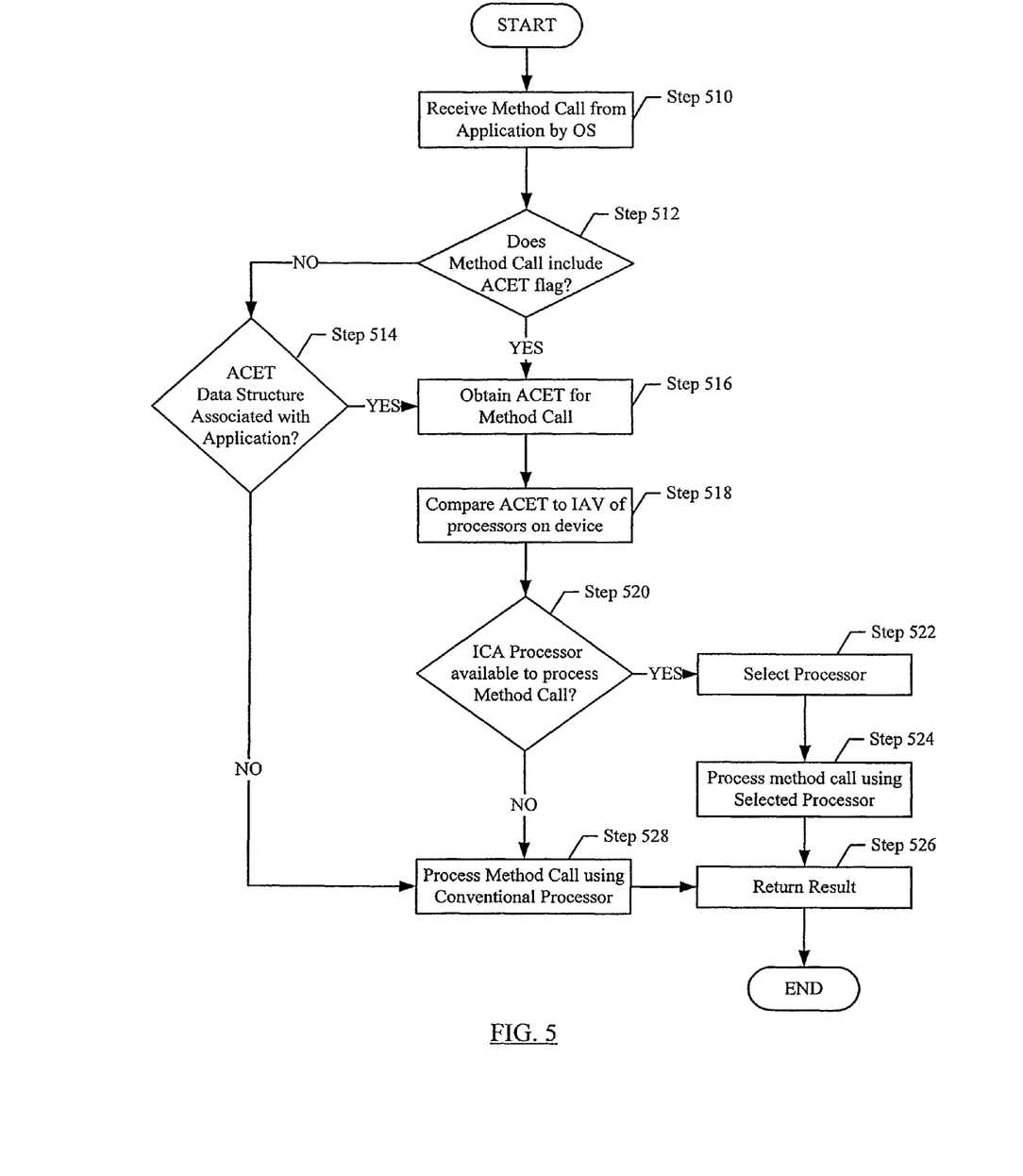

FIG. 5 shows a flow chart in accordance with one or more embodiments of the invention. In one or more embodiments of the invention, one or more of the steps shown in FIG. 5 may be omitted, repeated, performed in parallel, and/or performed in a different order than that shown in FIG. 5. Accordingly, the specific arrangement of steps shown in FIG. 5 should not be construed as limiting the scope of the invention.

In Step 510, the OS receives a method call from an application. In Step 512, the OS makes a determination regarding whether the method call includes an ACET flag. In one embodiment of the invention, the application may be configured to provide ACET values for its ICA application components to the OS. In such implementations, the ACET value may be provided as a flag (or other another parameter) in the method called issued by the application to the OS. If the OS determines that the method call includes an ACET flag, the method proceeds to Step 516; otherwise the method proceeds to Step 514.

Those skilled in the art will appreciate that will appreciate that the ACET value for a method call corresponds to the ACET value for the corresponding method within the application component. Said another, the application components specify methods, each of which specifies one or more operations. During execution, a call is made to the method (i.e., a method call) in order to perform the one or more operations specified in the method. In one embodiment of the invention, the method call is associated with an ACET value corresponding to the method which is being called.

Returning to FIG. 5, in Step 514, the OS makes a determination regarding whether an ACET data structure associated with the application is available. In one embodiment of the invention, the OS queries the persistent storage on the device to determine whether the persistent storage includes an ACET data structure store and, if so, whether the ACET data structure store include an ACET value for the method (corresponding to the method call). If the OS determines that the persistent storage includes an ACET data structure store and, that the ACET data structure store includes an ACET value for the method, then the process proceeds to Step 516; otherwise the process proceeds to Step 528.

In Step 516, the OS obtains the ACET value from the method call, if the method call includes a flag or from the ACET data structure store in the persistent storage on the device. In Step 518, the ACET value is compared to the IAV for each processor on the device.

In Step 520, the OS makes a determination regarding whether one or more ICA processors is available to process the method call. In one embodiment of the invention, this determination is based upon the comparison of the ACET value to the IAV in Step 518. In one embodiment of the invention, a given ICA processor is deemed available to process the method call if the ACET value of the method call is less than or equal to the IAV of the given ICA processor. For example, if the given ICA processor has an IAV of 0.15 and the ACET value of the method call is 0.10, then the ICA process is not available to process the method call as the IAV is outside the error tolerance of the method call. In another example, if the ACET value for a given process is 0.20 and the device includes ICA processors with IAVs of 0.10 and 0.15, then both of the ICA processors are available to process the method call.

Those skilled in the art will appreciate that in the context of this invention, the term "available" refers to whether a given method call may be executed on a given processor based on upon the ACET value of the method call and the IAV of the given processor. Further, the fact that a given processor is deemed "available" within the context of this invention does not mean that the method call is necessarily processed on the processor. For example, an "available" processor may not have any available processing time (i.e., all the processor's time has been scheduled), the processor may be offline (i.e., not powered on), the processor may be dedicated to another application and, as such, the OS may not allow the method call to be executed by the processor, etc.

Returning to Step 520, if no ICA processors are available (as determined in Step 520), the method proceeds to Step 528; otherwise the method proceeds to Step 522. Those skilled in the art will appreciate that the conventional processor is always deemed available to process the method call.

In Step 522, the OS selects a processor to process the method call. In one embodiment of the invention, if only one ICA processor is available (as determined in Step 520), then the ICA processor is selected to process the method call. In another embodiment of the invention, the PDP is used to select the processor (one of the available ICA processors or one of the available conventional processors). In Step 524, the method call is processed using the selected processor. In Step 526, the OS obtains the result of the processed method call. In Step 528, the method call is processed by the conventional processor.

In one embodiment of the invention, other system events (e.g., battery power drops below a certain level) may trigger the use of a given PDP to perform various operations.

Figure 6:
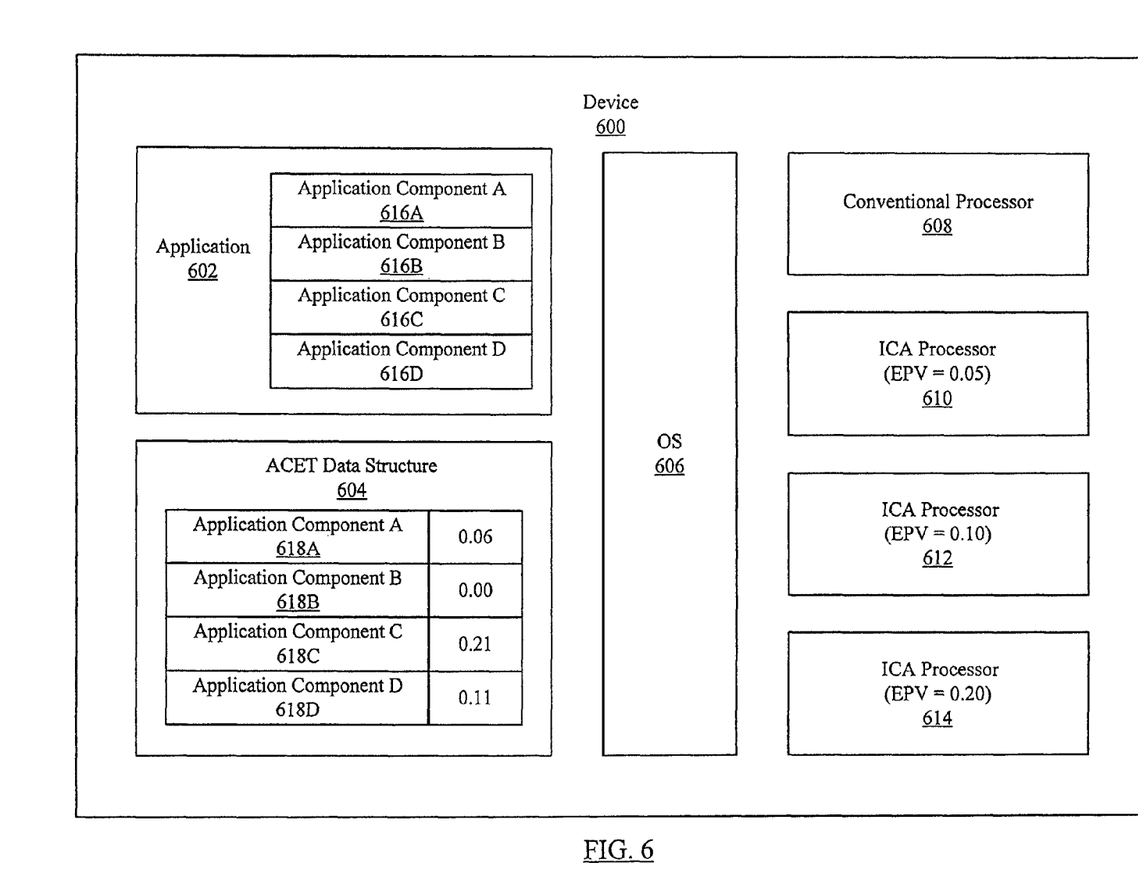
FIG. 6 shows an example in accordance with one or more embodiments of the invention.

FIG. 6 shows an exemplary system in accordance with one embodiment of the invention in which data is received. The exemplary system is not intended to limit the scope of the invention. Further, some elements unnecessary for the purposes of the exemplary figure may have been omitted.

As shown in exemplary FIG. 6, the device (600) includes an Application (602), an ACET Data Structure (604), an OS (606), a Conventional Processor (608), an ICA Processor with 0.05 IAV (610), an ICA Processor with 0.10 IAV (612), and an ICA Processor with 0.20 IAV (614). Further, the Application includes Application Component A (618A), Application Component B (618B), Application Component C (618C), and Application Component D (618D). The ACET Data Structure is associated with the Application (602), and includes four entries (618A, 618B, 618C, 618D). Each of the entries identifies an application component and a corresponding ACET value.

Scenario A: OS (606) implements Example Policy 1 (i.e., the ICA processor with the highest IAV is selected to process the method).

Upon receipt of a method call associated with Application Component A (616A), the OS (606) uses the ACET Data Structure (604) to determine the ACET value associated with the method call. Once the OS (606) determines that the ACET value associated with the method call is 0.06, the OS (606) determines which processor should be used to process the method call. At this point, the OS (606) determines whether there is at least one ICA processor that may be used to process the method call. Because the ACET value for the method call is 0.06, the OS (606) determines that there is one ICA processor (ICA Processor with 0.05 IAV (610)) which may be used to process the method call.

Based upon the policy described above, the OS (606) uses the processor with the highest compatible IAV to process the method call. Accordingly, the OS (606) uses ICA Processor with 0.05 IAV (610) to process the method call because ICA Processor with 0.05 IAV (610) is the processor with the highest compatible IAV (the ICA Processor with 0.10 IAV (612) and ICA Processor with 0.20 IAV (612) are not compatible).

Those skilled in the art will appreciate that in the scenario described above, method calls associated with Application Component B (616B) are always processed by the OS (606) using the Conventional Processor (608) because there are no ICA Processors available to process the method call (regardless of the processor distribution policy).

Scenario B: OS (606) implements Example Policy 2 (i.e., The ICA processor with the lowest IAV is selected to process the method)

Upon receipt of a method call associated with Application Component C (616C). OS (606) uses the ACET Data Structure (604) to determine the ACET value associated with the method call. Once the OS (606) determines that the ACET value associated with the method call is 0.21, the OS (606) determines which processor should be used to process the method call.

At this point, the OS (606) determines whether there is at least one ICA processor which may be used to process the method call. Because the ACET value for the method call is 0.21, the OS determines that the ICA Processor with 0.05 IAV (610), the ICA Processor with 0.10 IAV (612) and the ICA Processor with 0.20 IAV (612) are all available to process the method call.

Based upon the policy described above, the OS (606) uses the processor with the lowest compatible IAV to process the method call. Accordingly, the OS (606) uses ICA Processor with 0.05 IAV (610) to process the method call because ICA Processor with 0.05 IAV (610) is the processor with the lowest compatible IAV Scenario C: OS (606) implements Example Policy 3 (i.e., the ICA processor with the highest IAV and the lowest current utilization relative to the other available ICA processors is selected to process the method). For purposes of this scenario assume that the relative current processor utilization of the ICA processors is: ICA Processor with 0.20 IAV<ICA Processor with 0.10 IAV<ICA Processor with 0.05 IAV.

Upon receipt of a method call associated with Application Component C (616C). OS (606) uses the ACET Data Structure (604) to determine the ACET value associated with the method call. Once the OS (606) determines that the ACET value associated with the method call is 0.21, the OS (606) determines which processor should be used to process the method call.

At this point, the OS (606) determines whether there is at least one ICA processor which may be used to process the method call. Because the ACET value for the method call is 0.21, the OS determines that the ICA Processor with 0.05 IAV (610), the ICA Processor with 0.10 IAV (612) and the ICA Processor with 0.20 IAV (612) are all available to process the method call.

Based upon the policy described above, the processor with the highest compatible IAV and the lowest current utilization relative to the other available ICA processors is selected to process the method. Accordingly, the OS (606) uses ICA Processor with 0.10 IAV (610) to process the method call because ICA Processor with 0.10 IAV (610) is the processor with the highest compatible IAV and lowest current utilization relative to the other available ICA processors.

Those skilled in the art will appreciate that the above example relates to embodiments where the ICA values and the ACET values are represented as error rates. However, as described above, the IAVs and the ACET values may be represented as a magnitude of error. In such cases, an given ICA processor may return inexact results 100% of the time, where the magnitude of error is defined in the IAVs.

Embodiments of the invention described above enabling applications to execute on general purpose ICA processors and general purpose conventional processors with the aid of an intermediate operating system. In another embodiment of the invention, application-specific processors (ICA and convention) may be used to implement a computing device without an operating system.

Figure 7:
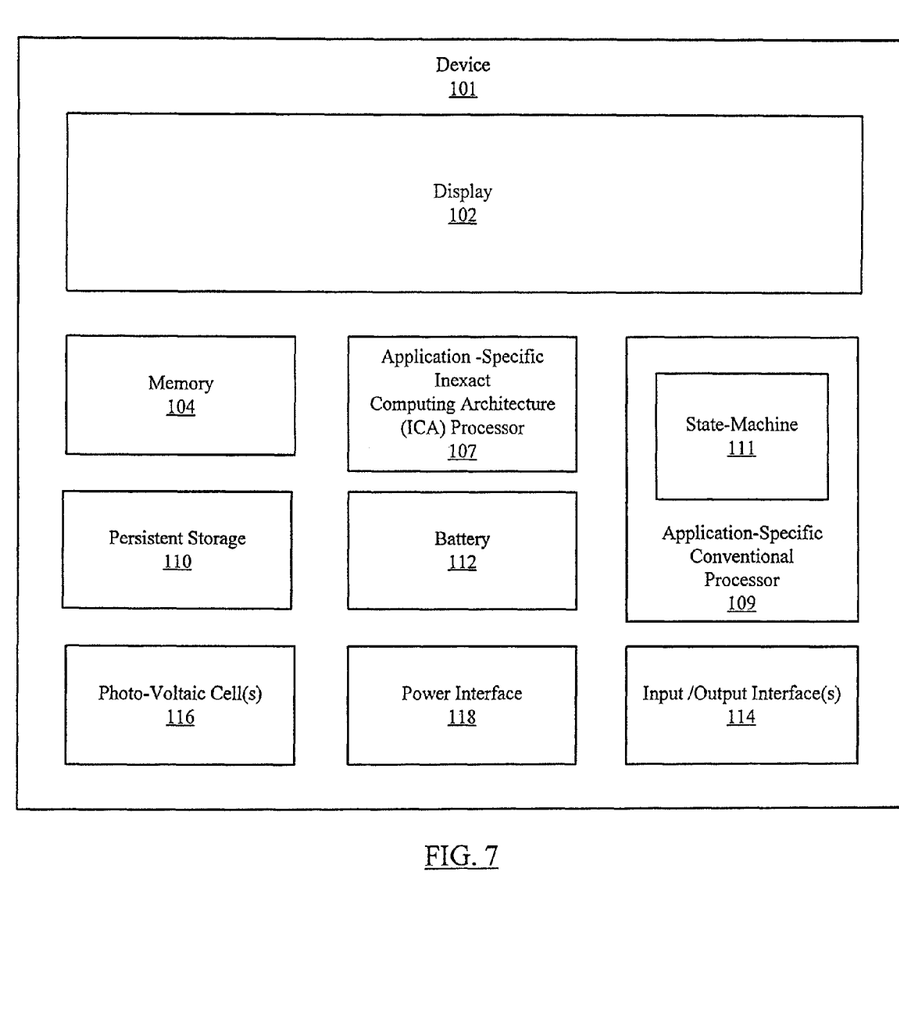
FIG. 7 shows a computing device in accordance with one or more embodiments of the invention.

FIG. 7 shows a computing device in accordance with another embodiment of the invention. The device (101) includes a display (102), memory (104), an application-specific ICA processor(s) (107), an application-specific conventional processor(s) (109), persistent storage (110), a battery (112), an input interface (114), a photo-voltaic cell (116), a power interface (118), and an output interface (120). The aforementioned components with like numbers are the same as the corresponding components in FIG. 1 (described above). The remaining components are described below.

In one embodiment of the invention, each application-specific ICA processor (107) is an ICA processor that is configured to perform an application (or a limited number of applications).

In one embodiment of the invention, the device shown in FIG. 7 does not require an operating system to execute an application. Rather, the application components are implemented as a family of hardware circuits (e.g., integrated circuits) within the Application-Specific ICA processor (107) and the application-specific conventional processor (109). In one embodiment of the invention, the each of the circuits is (explicitly or implicitly) associated with an ACET, which corresponds to the ACET of the application component the circuit is implementing. In this embodiment, the various application components (ICA and conventional) are identified and the corresponding circuits are subsequently created in the appropriate processor (ICA or conventional).

If there is more than one ICA processor, then the application components may be implemented (as circuits) in one or more of the application-specific ICA processors depending on the ACET of the given application components (and whether the ACET of a given application component change based on (i) the value of one or more registers and/or (ii) the state of the computing device). For example, if there are three application-specific ICA processors, then each of the application-specific ICA processors may include a circuit to perform the same operation and based on the remaining battery power in the battery (112) one of the three application-specific ICA processors is selected to perform the operation.

In one embodiment of the invention, the conventional processor (109) includes a state-machine (111). In one embodiment of the invention, the state-machine is implanted as a hardware circuit. In one embodiment of the invention, the state-machine (111) is configured to (i) determine whether to forward data to the application-specific ICA processor (107) in order for the application-specific ICA processor (107) to perform on operation on the data, (ii) receive input from other components on the device (101) and determine to which of the other components to forward the input, (iii) to receive results from the application-specific ICA processor (107) and the application-specific conventional processor (109) and determine to which component to forward the result.

In one embodiment of the invention, the state-machine may be programmable. For example, the state-machine may be configured to receive limited inputs, which dictate how it determines whether to have an operation performed on the application-specific ICA processor (107) or on the application-specific conventional processor (109). For example, the state-machine (111) may take as input a resolution value, which dictates the maximum resolution of images and text displayed on the display (102). Based on this, the state-machine (111) may send greater or fewer operations to the application-specific ICA processor (107) for processing. In another example, computing device (101) (potentially excluding the display) may be a router and the state-machine (111) may take as input a route table (e.g., a data structure that includes routes to network destinations on a computer network) for use by the router.

In one embodiment of the invention, the application-specific ICA processor may correspond to a graphics controller. Further, in such embodiments, the user (or other external source) may provide information about the resolution at which the graphics controller should operate. In another embodiment, as discussed above, the state-machine may be used to provide information about the resolution at which the graphics controller should operate. Accordingly, in one embodiment of the invention, a given computing device may include a conventional processor (general purpose (108 in FIG. 1) or application-specific (109 in FIG. 7)) and a graphics controller (implemented as an ICA processor (general purpose (106 in FIG. 1) or application-specific (107 in FIG. 7)).

Figure 8:
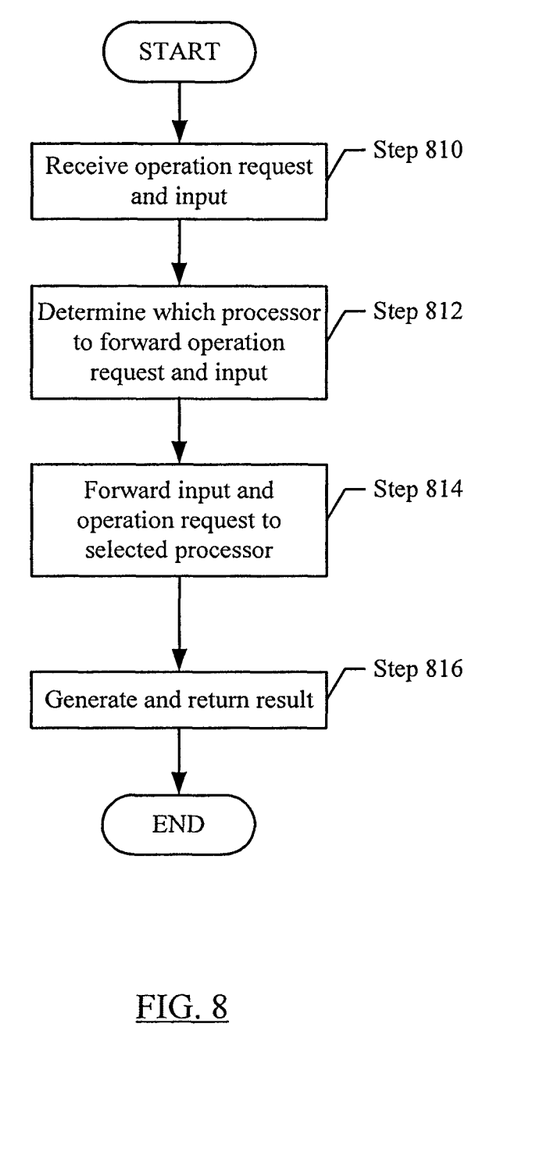
FIG. 8 shows a flowchart in accordance with one or more embodiments of the invention.

FIG. 8 shows a flow chart in accordance with one or more embodiments of the invention. In one or more embodiments of the invention, one or more of the steps shown in FIG. 8 may be omitted, repeated, performed in parallel, and/or performed in a different order than that shown in FIG. 8. Accordingly, the specific arrangement of steps shown in FIG. 8 should not be construed as limiting the scope of the invention.

In Step 810, receive operation request and input by state-machine. In one embodiment of the invention, the input may be received from an external source (e.g., a user input via a touch screen, etc.) or may be generated as a result of a change in state (e.g., battery power below a pre-set threshold, etc.). In one embodiment of the invention, the operation request corresponds to any request to perform a calculation by an application-specific processor (ICA or conventional).

In Step 812, the state-machine determines whether the operation corresponding to the operation request should be processed on the application-specific ICA processor or one the application-specific conventional. In one embodiment of the invention, the state-machine identifies the circuit(s) corresponding to the operation specified in the operation request. If more than one circuit corresponding to the operation specified in the operation request exists, the state-machine may use the PDP to determine to which of the circuit to forward the operation request and input.

In Step 814, the operation request and input is forwarded to the application-specific processor, which includes the appropriate circuit identified in Step 812.

In Step 816, the application-specific processor generates the result based, at least in part, on the input and returns the result to the state-machine. The state-machine, in response, determines what to do with the result. In one embodiment of the invention, the result is stored in a frame buffer on the computing device (not shown) and then subsequently displayed on the display of the device.

Figure 9:
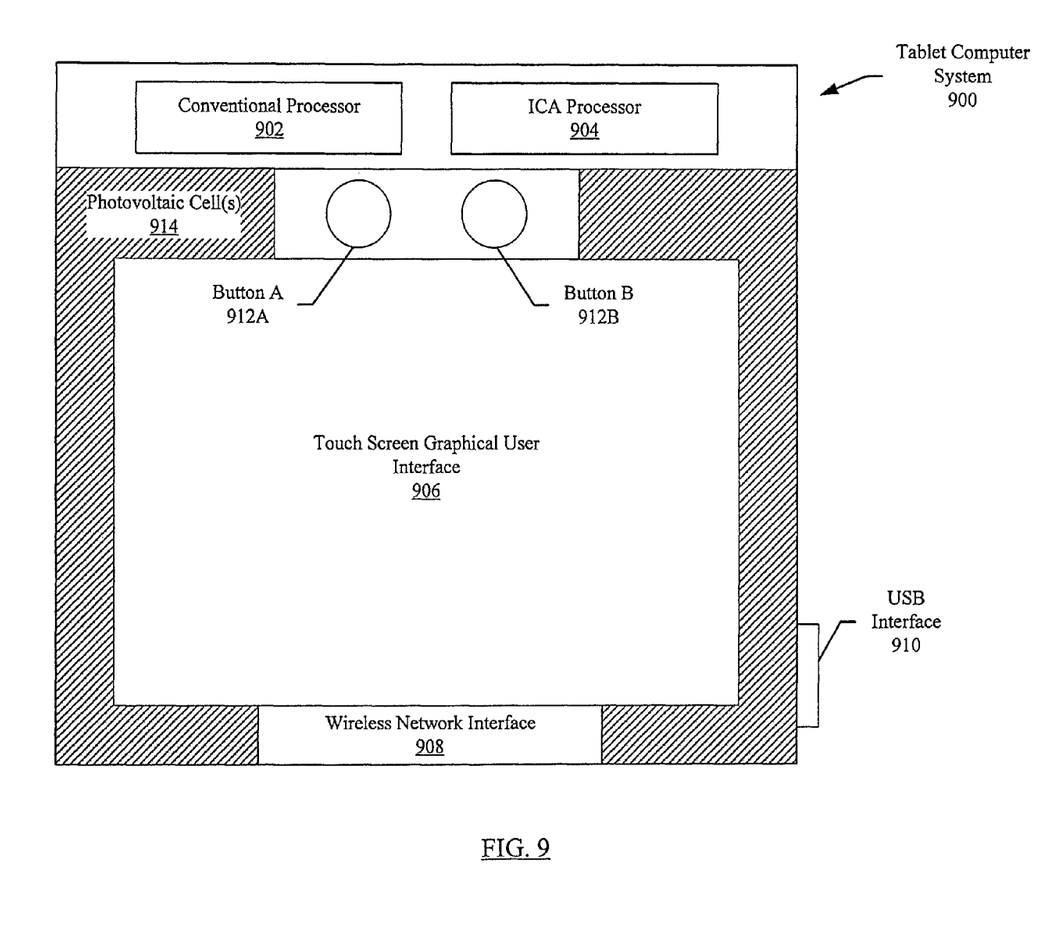
FIG. 9 shows an example in accordance with one or more embodiments of the invention.

FIG. 9 shows an example in accordance with one embodiment of the invention. Specifically, FIG. 9 depicts a tablet computer system (900) which includes a conventional processor (902) and an ICA processor (904). The system (900) also includes interfaces used for output and output such as the touch screen graphical user interface (906), wireless network interface (908), and USB interface (910). The system (900) includes input interface such as button A (912A) and button B (912B). The system (900) also includes photo-voltaic cells (914), which provide power to the device. The tablet computer system (900) also includes functionally necessary components not depicted in FIG. 9 (e.g., physical memory, persistent storage, power interface, battery, etc.). Those skilled in the art will appreciate that these input and output means may take other forms. Further, those skilled in the art will appreciate that one or more elements of the aforementioned system (900) may be remotely located and connected to the other elements over a network. Further, though not shown in FIG. 9, the tablet computer system (900) includes one or more applications configured to use the ICA processor and the conventional processor. In addition, the tablet computer system (900) includes an operating system (not shown) configured to implement the methods shown in FIGS. 4-5 (described above).

Those skilled in the art will appreciate that while the tablet computing system (900) shown in FIG. 9 is a slate-type tablet computing device, embodiments of the invention may be extended to other types of tablet computing systems, such as booklet-type tables computing devices. In one embodiment of the invention, booklet-type computing devices are dual screen tablet computers that fold open like a book, and include similar input/output capabilities as the slate-type computing devices. In one embodiment of the invention, slate-type tablet computing devices (such as the one shown in FIG. 9) resemble writing slates and are without a dedicated keyboard. For text input, users may utilize the touchscreen for input via fingertip, light pen, and/or stylus. Alternatively, or in addition to, the user may use an external keyboard, which can usually be attached via a wireless, or wired connection (e.g., a USB connection).

Those skilled in the art will appreciate that the tablet computer system (900) shown in FIG. 9 may be implemented using an application-specific ICA processor(s) and an application-specific conventional processor(s).

Software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. Computer readable medium comprising software instructions which, when executed by a processor, perform a method, the method comprising:
   receiving a first method call from an application, wherein the first method call is associated with a first application component;
   obtaining a first application component error tolerance (ACET) value associated with the first method call;
   determining, using the first ACET value and a first inexact amount value (IAV) of a first inexact computing architecture (ICA) processor, that the first ICA processor is available to execute the first method call; and
   processing the first method call using the first ICA processor.

2. The computer readable medium of claim 1, the method further comprising:
   receiving a second method call from the application, wherein the second method call is associated with a second application component;
   obtaining a second ACET value associated with the second method call;
   determining, using the second ACET value and the first IAV, that the first ICA processor is not available to execute the second method call; and
   processing the second method call using a conventional processor.

3. The computer readable medium of claim 1, the method further comprising:
   receiving a third method call from the application, wherein the third method call is associated with a third application component;
   obtaining a third ACET value associated with the third method call;
   determining, using the third ACET value and the first IAV, that the first ICA processor is available to execute the third method call;
   determining, using the third ACET value and a second IAV, that a second ICA processor is available to execute the third method call;
   selecting the second ICA processor to execute the third method call using a processor distribution policy; and
   processing the third method call using the second ICA processor.

4. The computer readable medium of claim 3, wherein the processor distribution policy is one selected from a group consisting of selecting a processor with a highest IAV to process the third method call, selecting a processor with a lowest IAV to process the third method call, selecting a highest IAV and a lowest current utilization relative to other available ICA processors to process the third method call, selecting a lowest IAV and a lowest current utilization relative to other available ICA processors to process the third method call, and selecting a conventional processor to process a method call.

5. The computer readable medium of claim 1, wherein the first application component is designated as an ICA application component, and wherein the application further comprises a second application component designated as a conventional application component.

6. The computer readable medium of claim 1, wherein the IAV value quantifies an error of the first ICA processor.

7. The computer readable medium of claim 6, wherein the error of the first ICA processor is defined as one selected from a group consisting of an error rate of the first ICA processor and a magnitude of error in a result generated by the first ICA processor.

8. The computer readable medium of claim 1, wherein determining that the first ICA processor is available to execute the first method call comprises determining that the first ACET value is not less than the first IAV.

9. A system comprising:
a conventional processor;
a first inexact computing architecture (ICA) processor associated with a first inexact amount value (IAV);
an application component error tolerance (ACET) data structure comprising a first ACET value associated with a first application component;
an inexact storage comprising software instructions which, when executed by the conventional processor, perform a method, the method comprising:
receiving a first method call from an application, wherein the first method call is associated with the first application component;
obtaining the first ACET value from the ACET data structure using the first method call;
determining, using the first ACET value and the first IAV, that the first ICA processor is available to execute the first method call; and
processing the first method call using the first ICA processor.

10. The system of claim 9,
wherein the ACET data structure further comprises a second ACET value associated with a second application component, and
wherein the method further comprises:
receiving a second method call from the application, wherein the second method call is associated with the second application component;
obtaining the second ACET value from the ACET data structure;
determining, using the second ACET value and the first IAV, that the first ICA processor is not available to execute the second method call; and
processing the second method call using the conventional processor.

11. The system of claim 9, further comprising:
a second ICA processor associated with a second IAV;
wherein the ACET data structure further comprises a third ACET value associated with a third application component, and
wherein the method further comprises:
receiving a third method call from the application, wherein the third method call is associated with the third application component;
obtaining the third ACET value from the ACET data structure;
determining, using the third ACET value and the first IAV, that the first ICA processor is available to execute the third method call;
determining, using the third ACET value and the second IAV, that the second ICA processor is available to execute the third method call;
selecting the second ICA processor to execute the third method call using a processor distribution policy; and
processing the third method call using the second ICA processor.

12. The system of claim 9, wherein the first application component is designated as an ICA application component, and wherein the application comprises a second application component designated as a conventional application component.

13. The system of claim 9, further comprising:
a photo-voltaic cell configured to provide power to the display, the conventional processor, the ICA processor, and the persistent storage,
wherein the system is a tablet device.

14. The computing device of claim 9, wherein the first IAV quantifies an error of the ICA processor.

15. The computing device of claim 14, wherein the error of the ICA processor is defined as one selected from a group consisting of an error rate of the ICA processor and a magnitude of error in a result generated by the ICA processor.

* * * * *